(12) United States Patent
Iida

(10) Patent No.: US 8,935,004 B2
(45) Date of Patent: Jan. 13, 2015

(54) ROBOT CONTROL METHOD AND ROBOT

(75) Inventor: Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 262 days.

(21) Appl. No.: 13/431,304

(22) Filed: Mar. 27, 2012

(65) Prior Publication Data

US 2012/0253516 A1 Oct. 4, 2012

(30) Foreign Application Priority Data

Mar. 29, 2011 (JP) ................. 2011-073562

(51) Int. Cl.
*B25J 9/16* (2006.01)
*G05B 19/04* (2006.01)
*B25J 9/00* (2006.01)
*B25J 13/08* (2006.01)

(52) U.S. Cl.
CPC ............. *B25J 9/1669* (2013.01); *B25J 9/0096* (2013.01); *B25J 13/082* (2013.01); *B25J 9/1612* (2013.01); *G05B 2219/39479* (2013.01)
USPC ............................ 700/250; 700/253; 700/254

(58) Field of Classification Search
CPC ...... B25J 9/1612; B25J 13/086; B25J 9/0096; B25J 9/1669; B25J 13/082; B25J 15/0009; G05B 2219/39479; G05B 2219/37277; G05B 2219/39527; G05B 2219/40625
USPC ........ 700/250, 253, 254, 262; 901/10, 31, 33, 901/39
See application file for complete search history.

(56) References Cited

U.S. PATENT DOCUMENTS

| | | | | |
|---|---|---|---|---|
| 5,215,923 | A * | 6/1993 | Kinoshita et al. | 436/47 |
| 5,325,468 | A * | 6/1994 | Terasaki et al. | 700/262 |
| 5,513,299 | A * | 4/1996 | Terasaki et al. | 700/255 |
| 6,229,552 | B1 * | 5/2001 | Koga et al. | 345/474 |
| 6,243,621 | B1 * | 6/2001 | Tao et al. | 700/245 |
| 7,406,362 | B2 | 7/2008 | Hariki et al. | |
| 2007/0231108 | A1 * | 10/2007 | Yilmaz | 414/217 |
| 2013/0136569 | A1 * | 5/2013 | Rosmarin et al. | 414/618 |

FOREIGN PATENT DOCUMENTS

| | | |
|---|---|---|
| JP | 06-297364 | 10/1994 |
| JP | 07-116973 | 5/1995 |
| JP | 07-155871 | 6/1995 |
| JP | 2005-081442 | 3/2005 |

* cited by examiner

*Primary Examiner* — Jason Holloway
(74) *Attorney, Agent, or Firm* — Harness, Dickey & Pierce, P.L.C.

(57) ABSTRACT

A robot control method includes gripping a work with a hand unit; transferring the work to the vicinity of a plane; dropping the work to the plane by reducing the grip force of the hand unit, and aligning the work with the plane; and re-gripping the work, which is aligned with the plane, again with the hand unit.

5 Claims, 15 Drawing Sheets

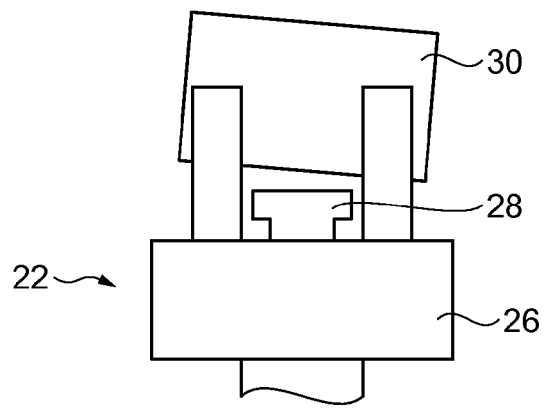
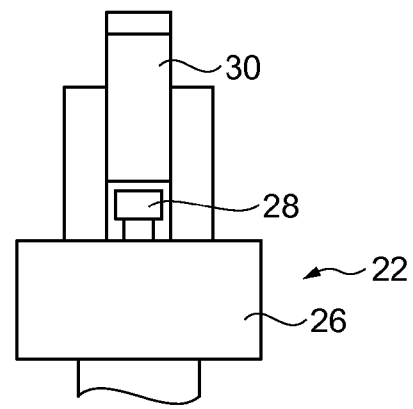
FIG.15A　　　　FIG.15B
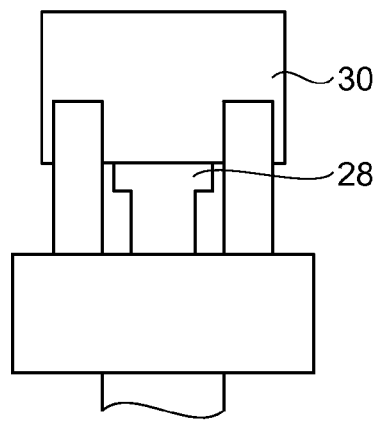
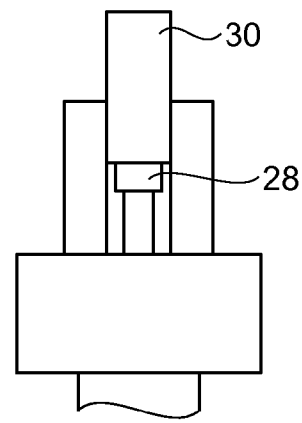
FIG.15C　　　　FIG.15D

ROBOT CONTROL METHOD AND ROBOT

BACKGROUND

1. Technical Field

The present invention relates to a robot control method and a robot.

2. Related Art

When an operation of gripping a work which is an operation target and imposing an additional component on the corresponding work is performed using a robot (robot apparatus), it is necessary to recognize the coordinate system of the work, that is, a position and posture. Therefore, for example, as disclosed in JP-A-6-297364, a robot control method of performing an imposition operation while both the work and the component which is imposed on the corresponding work are gripped with a robot provided with a position detection unit is presented. However, when the imposition operation is performed on the corresponding work while the work is fixed by only a robot (in more detail, a hand unit provided in the corresponding robot), grip force which is needed for the corresponding robot increases. That is, an actuator with large driving force is necessary for the hand unit, and, as a result, the weight, size, and cost of the robot increase.

As a method corresponding to this situation, that is, as a method of fixing a work without applying an excessive load to the hand unit of the robot, for example, a method of controlling a robot which places a work on a plane surface, and grips the corresponding work with a hand unit while the weight of the corresponding work is placed on the plane, as disclosed in JP-A-2005-81442, has been presented.

However, the above-described robot control methods have a problem in that time is necessary for an adjustment operation of matching the coordinate system of a work with the coordinate system of a plane. When a work is gripped in the state in which the above-described coordinate systems are not matched, the imposition operation becomes inaccurate. Therefore, there is a problem in that it is difficult to satisfy both the improvement of the accuracy of imposition and operation efficiency.

SUMMARY

An advantage of some aspects of the invention is to solve at least part of the above-described problems, and the invention can be implemented as the following forms or application examples.

Application Example 1

This application example is directed to a robot control method including: gripping a work with a hand unit; transferring the work to the vicinity of a plane; dropping the work to the plane by reducing the grip force of the hand unit, and aligning the work with the plane; and re-gripping the work, which is aligned with the plane, again with the hand unit.

In such a robot control method, the work which is positioned on a plane surface is gripped again, so that the work can be gripped in the state in which the coordinates thereof are matched with the coordinates of the plane regardless of coordinates when initial grip was performed. That is, the coordinates can be automatically matched using the plane. Therefore, the coordinate system of the work can be easily matched with the coordinate system of the plane. Further, the work, in the state in which the coordinate system thereof is matched, can be gripped with the hand unit while weight is placed on the plane. Therefore, when an operation of imposing an additional component is performed on the work, both the improvement of imposition accuracy and the improvement of operation efficiency can be satisfied. Further, when the plane is a work table, transfer to an additional work table is easily performed.

Meanwhile, the above-described "transfer to the vicinity of the plane" includes both an operation of transferring the work to a position included in the plane in a planar view and an operation of approximating the work to the plane in the vertical direction (gravity direction), that is, includes both movement in the horizontal direction and movement in the vertical direction. Further, the "vicinity" includes the contact of a part of the work.

Application Example 2

This application example is directed to the above-described robot control method, wherein the hand unit includes a sensor which is capable of detecting the contact of the work and the plane, and the transferring includes approximating the hand unit to the plane until the sensor detects the contact of a part of the work and the plane.

In such a robot control method, the dropping distance of the work may be reduced in the dropping and aligning the work. Therefore, shocks applied to the work can be reduced when the release process is performed.

Application Example 3

This application example is directed to the above-described robot control method, wherein the sensor is any one of three types of sensors which include a pressure sensor which measures pressure applied to the work, a force sensing sensor which measures force applied to the hand unit, and an image sensor which images an interval between the work and the plane.

In such a robot control method, the contact of apart of the work and the plane can be securely detected. Therefore, effects on the work can be reduced when the transferring and the dropping and aligning the work are performed.

Application Example 4

This application example is directed to the above-described robot control method, wherein the plane is approximately horizontal, and the re-gripping is performed after a predetermined time elapsed after the dropping and aligning the work starts.

In such a robot control method, even when the work is vibrated on the plane immediately after the dropping and aligning the work is performed, re-grip can be performed after the corresponding vibration is settled. Further, the stopped work can be gripped again in the state in which the work is aligned with the plane without using a sensor which detects the above-described vibration. Therefore, the above-described imposition operation can be performed effectively without increasing cost.

Application Example 5

This application example is directed to the above-described robot control method, wherein the robot includes a slide sensor, which measures the slide amount of the work with respect to the hand unit, in a portion of the hand unit which comes into contact with the work, and the dropping and aligning the work is performed while the grip force of the hand unit is adjusted such that the slide amount per unit time is less than a threshold.

In such a robot control method, the work can be gradually approximated to the plane in the dropping and aligning the work. Therefore, shock applied to the work can be reduced, compared to the case where the work is freely dropped. Meanwhile, the threshold is the value of a degree in which the damage to the work can be sufficiently avoided in the dropping and aligning the work and a value which differs depending on the work.

Application Example 6

This application example is directed to the above-described control method, wherein the re-gripping is performed after a predetermined time has elapsed after the dropping and aligning the work starts.

In such a robot control method, the work can be gripped again in the state in which the stopped work is aligned with the plane without using a sensor which detects the drop of the work to the plane surface. Therefore, the above-described imposition operation can be performed efficiently without increasing costs.

Application Example 7

This application example is directed to a robot control method of controlling a robot that includes a hand unit which has a planar portion and which can grip a work at a position which is separated from the planar portion, the method including gripping the work with the hand unit; and pressing the work and the planar portion together.

In such a robot control method, the coordinate system of the hand unit can be easily matched with the coordinate system of the work. Therefore, it is possible to perform an operation of imposing an additional component on the corresponding work by placing the work on the work table which has a well-known coordinate system as the relative relationship with the coordinate system of the hand unit without matching the coordinate system of the work with the coordinate system of the work table. Therefore, the operation efficiency can be improved without dropping imposition accuracy.

Application Example 8

This application example is directed to the above-described robot control method, wherein the pressing includes driving the robot such that the planar portion positions in the gravity direction of the hand unit; and dropping the work to the planar portion by reducing the grip force of the hand unit, and aligning the work with the planar portion.

In such a robot control method, the work and the planar portion can be pressed only by adjusting the grip force of the hand unit. Therefore, the coordinate system of the hand unit can be easily matched with the coordinate system of the work without complicating the configuration of the arm.

Application Example 9

This application example is directed to the above-described control method, wherein the robot includes a slide sensor, which measures the slide amount of the work with respect to the hand unit, in the portion of the hand unit which comes into contact with the work, and the dropping and aligning the work includes adjusting the grip force of the hand unit such that the slide amount per unit time is less than a threshold, and dropping the work.

In such a robot control method, shock applied when the work hits the planar portion can be reduced. Therefore, the work can be aligned with the planar portion while a possibility that damage may occur to the work is reduced. Meanwhile, the threshold is the value of a degree in which the damage to the work can be sufficiently avoided in the dropping and aligning the work and a value which differs depending on the work.

Application Example 10

This application example is directed to the above-described robot control method, wherein the planar portion is a moving member which can move in the direction of the gripped work, and the pressing includes pressing the planar portion against the work which is gripped with the hand unit.

In such a robot control method, the corresponding work and the planar portion can be pressed without dropping the work.

Application Example 11

This application example is directed to the above-described robot control method, wherein the planar portion is a moving member which includes a force sensor which measures a force applied to the corresponding planar portion when an operation is performed, and the pressing includes adjusting at least any one of grip force of the hand unit and the operation velocity of the planar portion such that the force is less than or equal to a threshold, and operating the planar portion.

In such a robot control method, frictional force which occurs between the work and the hand unit when the pressing is performed can be restricted to be less than a predetermined value. Therefore, the work can be aligned with the planar portion while the probability that damage occurs to the work is reduced. Meanwhile, the threshold is the value of a degree in which the damage to the work can be sufficiently avoided in the pressing and a value which differs depending on the work.

Application Example 12

This application example is directed to the above-described robot control method, wherein the hand unit is a planar portion which includes a bearing unit, and a rotation sensor which measures the number of rotations of the corresponding bearing unit, and the pressing includes gripping the work with the bearing unit, adjusting at least any one of the grip force of the hand unit and the operation velocity of the planar portion such that the number of rotations is less than or equal to a threshold, and operating the planar portion.

In such a robot control method, it is possible to press the work against the planar portion without dropping the work or sliding between the work and another component. Therefore, the work can be aligned with the planar portion while the probability that damage occurs to the work is further reduced. Meanwhile, the threshold is the value of a degree in which the damage to the work can be sufficiently avoided in the pressing and a value which differs depending on the work.

Application Example 13

This application example is directed to a robot including: a hand unit, and the hand unit includes a base portion, a planar portion which is disposed on the base portion, and finger units which are capable of gripping a work at a position which is separated from the base portion. The robot can perform an operation of gripping the work placed in a gravity direction with the finger units, an operation of inverting the hand unit such that the hand unit is positioned in the gravity direction of the work which is gripped with the planar portion, and an operation of dropping the work to the planar portion by reducing the grip force of the finger units.

In such a robot, the coordinate system of the hand unit can be matched with the coordinate system of the work by only adjusting the grip force of the hand unit. Therefore, in such a robot, it is possible to perform an operation of imposing an additional component on the corresponding work by placing the work on the work table which has a well-known coordinate system as the relative relationship with the coordinate system of the hand unit.

Application Example 14

This application example is directed to a robot including: a hand unit, and the hand unit includes a base portion, finger units which can grip a work at a position which is separated from the base portion, and a planar portion which can move from the base portion to the directions of the finger units. The robot may perform an operation of enabling the finger units to grip the work, and an operation of moving the planar portion in the direction of the gripped work and pressing the planar portion against the work.

In such a robot, the coordinate system of the hand unit can be matched with the coordinate system of the work without dropping the work or inverting the hand unit. Therefore, in such a robot, it is possible to easily perform an operation of imposing an additional component on the corresponding work by placing the work on the work table which has a well-known coordinate system as the relative relationship with the coordinate system of the hand unit.

BRIEF DESCRIPTION OF THE DRAWINGS

The invention will be described with reference to the accompanying drawings, wherein like numbers reference like elements.

FIGS. 15A to 15D are process charts illustrating a robot control method according to a fifth embodiment.

DESCRIPTION OF EXEMPLARY EMBODIMENTS

Figure 1:
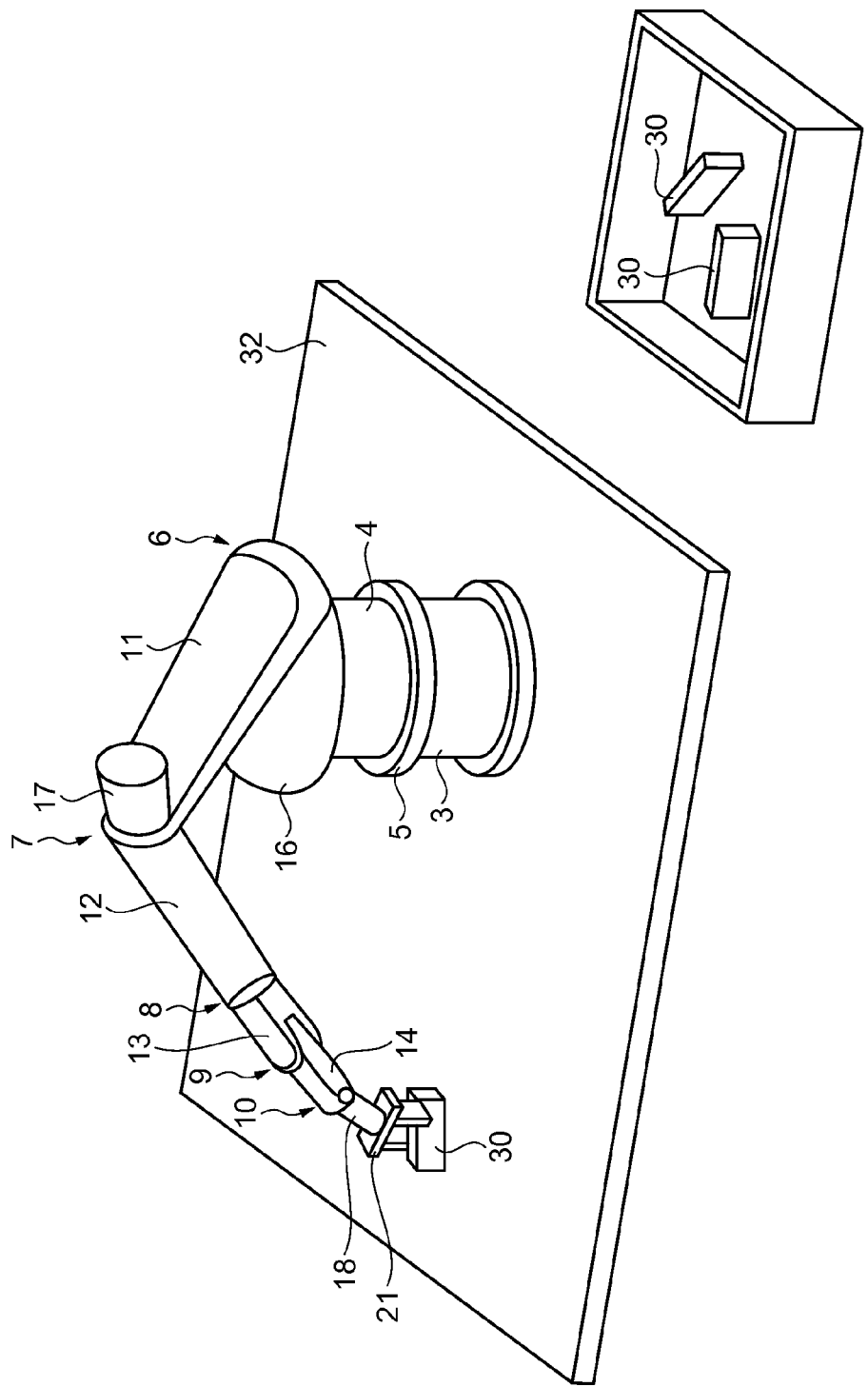
FIG. 1 is a perspective view illustrating the outline of a robot.

Hereinafter, a robot control method according to embodiments of the invention will be described with reference to the accompanying drawings. Meanwhile, the embodiments of the invention are not limited to the structures and shapes shown in the drawings below. Further, in each drawing, components are shown in dimensions which can be recognized in the drawing, so that the scales of the corresponding components are different from actual sizes.
First Embodiment
Robot FIG. 1 is a perspective view illustrating the outlines of a robot 1 which is used in a first embodiment and each embodiment which will be described later and an operation which is performed by the robot 1. Meanwhile, in the drawing, a control apparatus which controls the robot 1 is not shown.

As shown in the drawing, the robot 1 includes an upper pedestal 4, a lower pedestal 3, a plurality of arms, and motors which drive the corresponding arms. The upper pedestal 4 is provided on the lower pedestal 3 and is rotated at a rotation position 5 by driving a motor (not shown). A first arm 11 is installed on the upper pedestal 4, and is rotated at a rotation position 6 by driving a motor 16. A second arm 12 is connected to the first arm 11, and is rotated at a rotation position 7 by driving a motor 17. A third arm 13 is connected to the second arm 12 and is rotated at a rotation position 8 by driving a motor (not shown). A fourth arm 14 is installed on the third arm 13 and is rotated around a rotation position 9 by driving a motor (not shown). A wrist section 18 is connected to the fourth arm 14 and is rotated at a rotation position 10 by driving a motor (not shown).

Further, a first hand unit 21 capable of gripping a work 30 is mounted at the end of a wrist section 18 of the robot 1. The robot 1 can grip the work 30, which is stored in apart box (no reference numeral) or the like, with the first hand unit 21, deliver the work 30, place the work 30 on the planar work table 32, and then fix the work 30 on the work table 32 as it is.

Meanwhile, although the robot 1 is disposed on the work table 32 in the drawing, the invention is not limited thereto. If the above-described first hand unit 21 can place the work 30, which is stored in the part box (no reference numeral) or the like, on the work table 32, the robot 1 may be installed in the vicinity of the work table.

Figure 2:
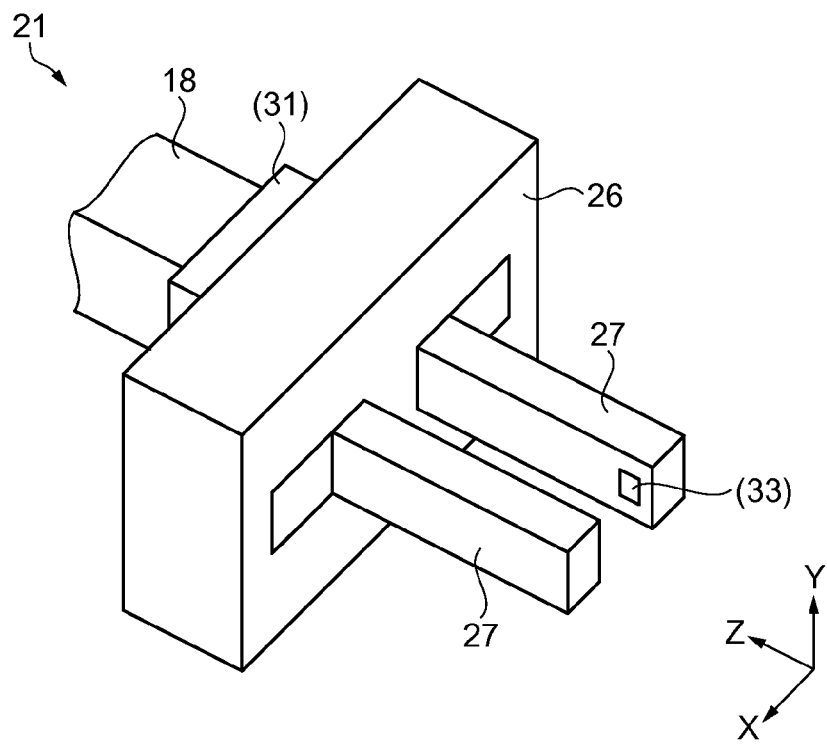
FIG. 2 is a perspective view illustrating the outline of a first hand unit.

FIG. 2 is a perspective view illustrating the layout of the first hand unit 21. As shown in the drawing, the first hand unit 21 includes a base portion 26 and finger units 27, which are disposed at the end portion of the wrist section 18, as main components. The finger units 27 can move in the X direction along grooves (no reference numerals) which are formed in the base portion 26. The first hand unit 21 can grip the work 30 by closing the finger units 27, and further can drop the griped work 30 by releasing the finger units 27.

The first hand unit 21 includes a contact sensor 31, which can detect the fact that the work 30 gripped with the corresponding first hand unit comes into contact with another object, such as the work table 32, on the base portion 26. Further, the first hand units 21 includes slide sensors 33, which can detect the fact that the work 30 gripped with the corresponding finger units relatively moved against the corresponding finger units, in the inner surfaces of the finger units 27. However, the first hand units 21 used according to the first embodiment do not include any of the above-described contact sensor 31 and the slide sensors 33. Further, although the first hand unit 21 used according to the second embodiment includes a contact sensor 31, the first hand unit 21 does not include the slide sensors 33.

The slide sensor 33 is formed using a pressure-sensitive conductive rubber which is a pressure sensitive element, that is, a kind of an element which outputs a signal corresponding to pressure. When an object (that is, the work 30) which comes into contact with the slide sensor 33 slides, voltage variation occurs in an output voltage which is obtained from the pressure-sensitive conductive rubber which functions as the pressure sensitive element. The robot can calculate slide amount by analyzing this voltage variation using the control apparatus (not shown).

Further, the contact sensor 31 is a force sensing sensor which detects the variation in force applied between the wrist section 18 and the base portion 26. When the work 30, which is gripped with the first hand unit 21, comes into contact with another object (the work table 32 in the first embodiment), the above-described force varies. The contact sensor 31 can change the variation in this force into the variation in the output voltage, and can transmit the variation to the above-described control apparatus. Therefore, when the work 30 comes into contact with other portions, the robot 1 can immediately stop the driving of the first hand unit 21 or the above-described 6 axes which are connected to the corresponding hand unit.

Meanwhile, in addition to the above-described force sensing sensor, a pressure sensor or an image sensor can be used as the contact sensor 31.

Figure 3:
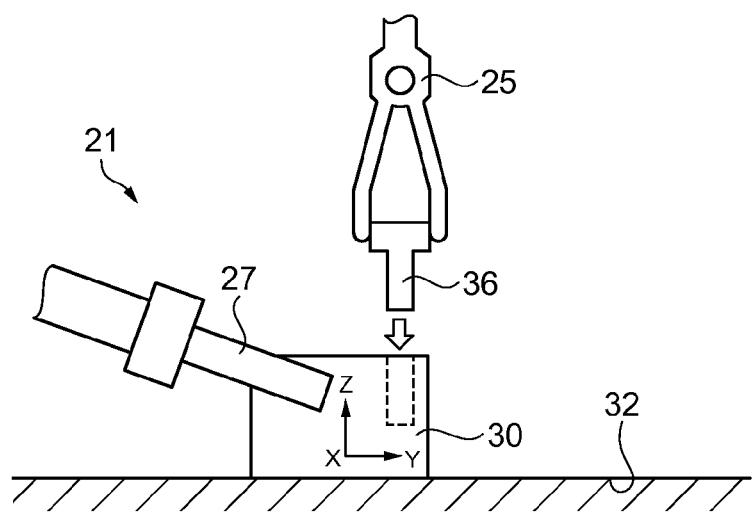
FIG. 3 is a view illustrating the mode of a job, which is performed on a work, together with the first hand unit.

FIG. 3 is a view illustrating the mode of an operation, which is performed on the work 30, together with the first hand unit 21. The operation performed on the work 30 in the first embodiment is an operation of imposing an additional component on the work 30. In detail, the operation is an operation of imposing a second work 36, which is a bar-shaped component, such as a screw, from the approximately upper side of the work 30 using a fifth hand unit 25 of an additional robot. While the operation is performed, the work 30 is placed on the work table 32. The force applied to the corresponding work when the second work 36 is imposed on the work 30, that is, the force in the approximately gravity direction is received by the work table 32. Therefore, even when an imposition operation is performed such that strong force is applied to the work 30 in the approximately gravity direction, it is sufficient for the first hand unit 21 to only fix the work 30 in the horizontal direction. Here, it is necessary that the base portion of the work 30 correctly comes into contact with the work table 32 such that the work table 32 receives the force in the gravity direction as described above. That is, it is necessary that the coordinate system of the work is matched with the coordinate system of a plane. The robot control method according to the first embodiment and each embodiment which will be described later can perform this match without using a complicated control apparatus and an observation apparatus.

Work

Figure 4A:
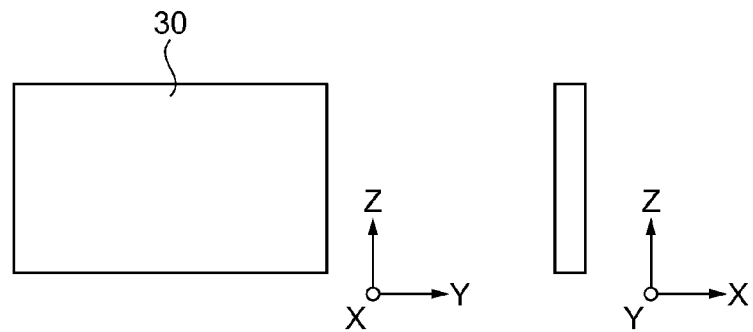
FIGS. 4A to 4C are views illustrating examples of the shapes of works which can be used according to a first embodiment.
Figure 4B:
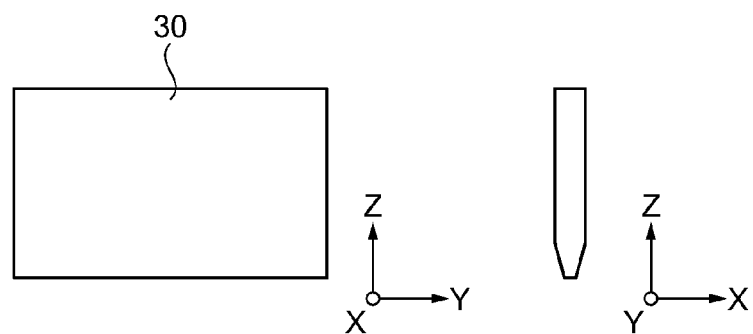
Figure 4C:
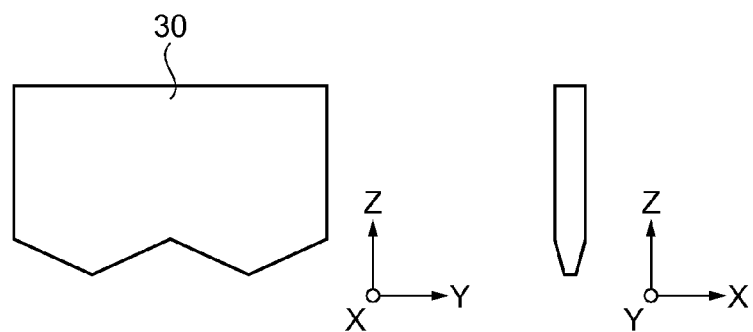

FIGS. 4A to 4C are views illustrating examples of the shapes of the work 30 which can be used according to the first embodiment and each embodiment which will be described later, together with the first hand unit 21. In the drawings and each drawing which will be described later, a direction which is perpendicular to the surface of the work 30 (hereinafter, referred to as "side surface") which is gripped with the first hand unit 21 is called an X direction. Further, the side of the work 30 which will come into contact with the work table 32 in the future is called a "base portion". A direction which is perpendicular to the X direction within the surface which includes the base portion is assumed as a Y direction. Further, a direction which is perpendicular to both the Y direction and the X direction is assumed as a Z direction, states which are viewed from the X direction and the Y direction are shown.

FIG. 4A is a view illustrating a plate-shaped work 30, that is, a rectangle in which the size in the X direction is smaller. Although this shaped work 30 is a rectangle, the work 30 is difficult to make freestanding. However, the work 30 can be stably placed on the work table 32 (refer to FIG. 3) by gripping and fixing the side surfaces thereof with the first hand unit 21.

Although the work 30 is shown as a rectangle in the above-described FIG. 3, the shape of the work 30 is not limited to such.

FIG. 4B is a view illustrating the work 30 which has a shape in which only the base portion is narrow. Even in the case of this shaped work 30, the side surfaces thereof can be gripped with the first hand unit 21, so that the work 30 can be stably placed on the work table 32.

FIG. 4C is a view illustrating the work 30 which has a shape in which the two points of the base portion come into contact with the work table 32. Generally, it is necessary that three points come into contact with a plane in order to stop an object on a plane surface. However, when side surfaces are gripped with the first hand unit 21, such shaped work 30 can be stably maintained in the state in which only two points come into contact with the work table 32.

Robot Control Method

Figure 5:
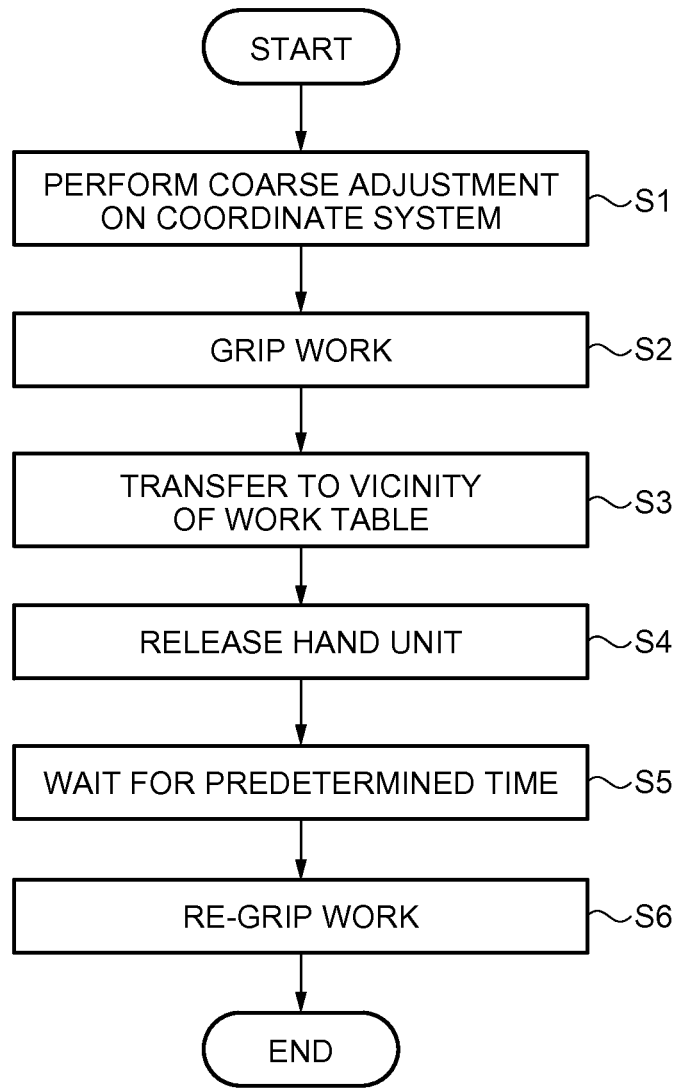
FIG. 5 is a flowchart illustrating a robot control method according to the first embodiment.

FIG. 5 is a flowchart illustrating a robot control method according to the first embodiment. Further, FIGS. 6A to 6F are process charts illustrating the robot control method according to the first embodiment. In FIGS. 6A to 6F, FIGS. 6A, 6C, and 6E are views in which the work 30 is viewed from the X direction, and FIGS. 6B, 6D, and 6F are views in which the work 30 is viewed from the Y direction. Further, although FIGS. 6B, 6D, and 6F are not cross-sectional views, the finger units 27 are hatched.

The robot control method according to the first embodiment includes four processes below. A grip process is a process of gripping the work 30 with the first hand unit 21. A transfer process is a process of transferring the work 30 to the vicinity of the work table 32. A release process is a process of dropping the work 30 on the work table 32. A re-grip process is a process of gripping the work 30, which stops on the work table 32 after dropping, with the first hand unit 21 again. Hereinafter, description will be made in the order of processes using the drawings viewed from both directions.

First, coarse adjustment is performed on coordinate systems in step S1. Thereafter, the work 30 is gripped with the first hand unit 21 in a place which is different from the work table 32 in step S2. These steps S1 and S2 correspond to the grip process. The coarse adjustment of the coordinate systems is to roughly recognize the relative relationship between the coordinate system of the robot and the coordinate system of the surrounding space of the robot. In the robot control method according to the first embodiment, it is not necessary to exactly recognize the relative relationship but it is necessary to deliver the work 30 to the vicinity of the work table 32 as described later, so that rough recognition is necessary.

After the recognition is obtained in step S1, the work 30, which is placed on the place which is apart from the work table 32, is gripped with the first hand unit 21 (refer to FIG. 1) in step S2.

Figure 6A:
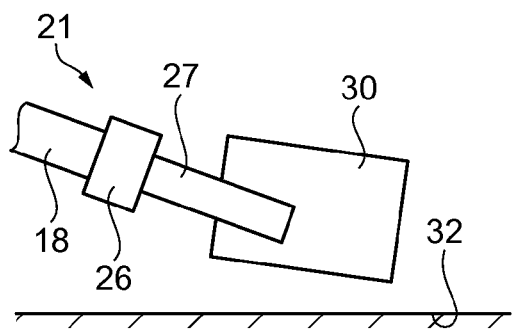
FIGS. 6A to 6F are process charts illustrating the robot control method according to the first embodiment.
Figure 6B:
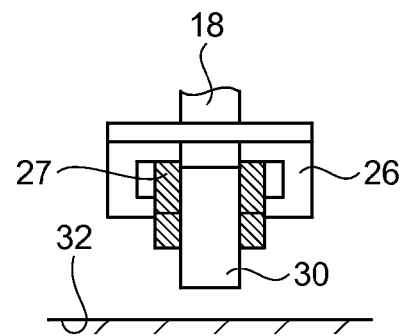

Next, as shown in FIGS. 6A and 6B, the above-described 6 axes of the of the robot 1 are controlled such that the work 30 and the first hand unit 21, which grips the corresponding work, are transferred to the vicinity of the work table 32 in step S3. This step S3 corresponds to the transfer process.

As shown in the drawings, the first hand unit 21 is stopped at the state in which the work 30 is positioned in the vicinity of the work table 32, that is, in the state in which the work 30 is some distance from the work table 32 in step S3. The "some distance" is a distance in which the quality of work 30 is not affected even when at least the work 30 is dropped to the work table 32. This distance differs based on the shape, weight, and material of the work 30. Further, if the accuracy of the coarse adjustment is high in step S1, this "some distance" can be reduced.

Figure 6C:
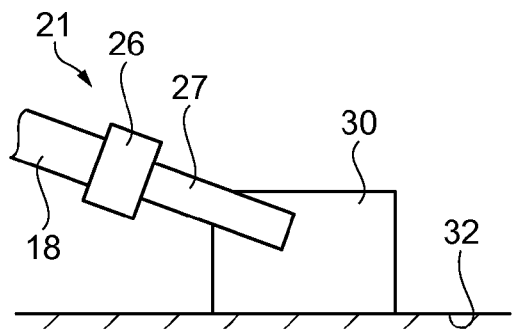
Figure 6D:
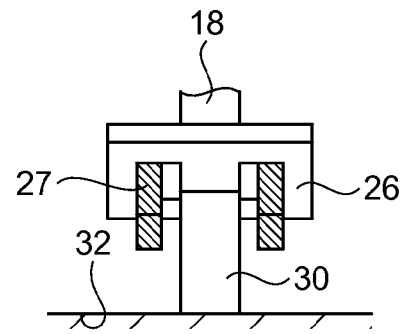

Next, as shown in FIGS. 6C and 6D, the grip force of the first hand unit 21 is reduced by releasing the finger units 27, so that work 30 is dropped (freely falls) to the work table 32 in step S4. Thereafter, a predetermined time is waited while the finger units 27 are released in next step S5. Thereafter, (the base portion of) the work 30 is aligned with the work table 32. That is, the work 30 is into a state in which the base portion of the corresponding work is stable with respect to the work table 32. These steps S4 and S5 correspond to the release process. Meanwhile, the above-described predetermined time corresponds to time obtained by adding some margin to time that is necessary until the work 30 is aligned with the work table 32. Therefore, the predetermined time varies depending on the shape or material of the work 30.

In the first embodiment, the finger units 27 are released until the finger units 27 are completely separated from the work 30. Thereafter, the grip force of the first hand unit 21 becomes 0. However, it is preferable that the finger units 27 be not released more than necessary. As described above, the work 30 includes the work in which the base portion thereof, that is, the portion where comes into contact with the work table 32, is linear or the base portion includes only two points. In the case of such a work 30, the work may be inclined at an angle on the work table 32 when the finger units 27 are largely released. Therefore, it is preferable that the release of the finger units 27 stops at the stage where the finger units 27 are separated from the side surfaces of the work 30.

Figure 6E:
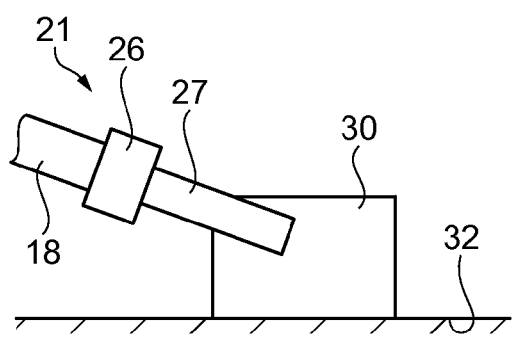
Figure 6F:
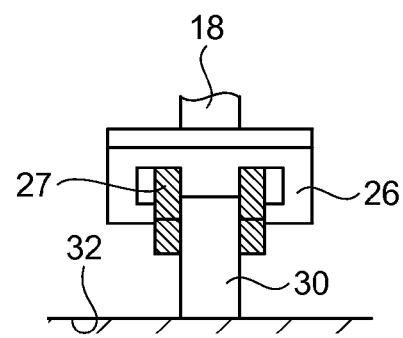

Next, as shown in FIGS. 6E and 6F, the work 30 which is aligned with the work table 32 is gripped again by closing the finger units 27 in step S6. This step S6 corresponds to the re-grip process.

In the above-described re-grip process, the work 30, which is placed in the state in which the coordinates thereof is indefinite, can be delivered to the work table 32, and, at the same time, the work 30 can be fixed by the first hand unit 21 in the state in which the base portion thereof is aligned with the work table 32. That is, the side surfaces of the work 30 which is placed on the work table 32 can be fixed and supported by the first hand unit 21.

Figure 7:
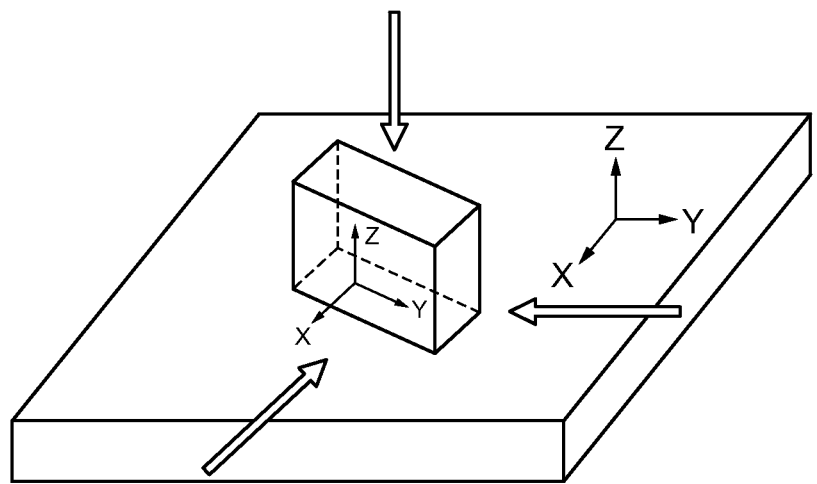
FIG. 7 is a perspective view illustrating a work which is placed on a work table.

FIG. 7 is a perspective view illustrating the work 30 which is placed on the work table 32 by performing the grip process to the re-grip process. The first hand unit 21 is not shown in the drawing. Since the base portion of the work 30 is aligned with the work table 32, the Z direction of the work 30 is the same as the Z direction of the work table 32 when the coordinates of the work table 32 are defined in the X direction, in the Y direction, and in the Z direction as shown in the drawing.

Figure 8A:
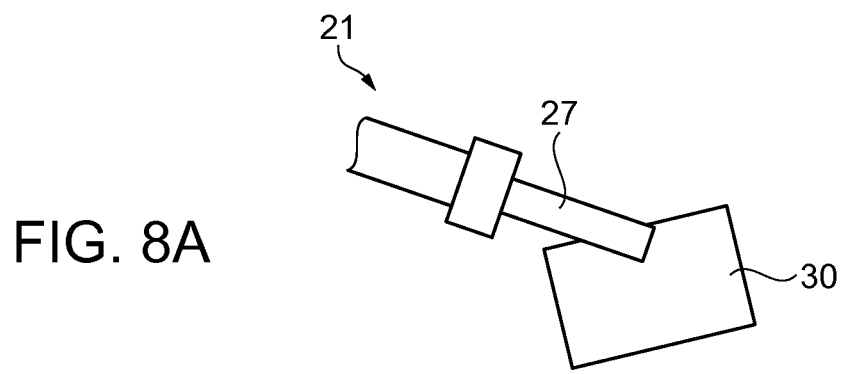
FIGS. 8A and 8B are views illustrating the first hand unit and the work when a transfer process is performed.
Figure 8B:
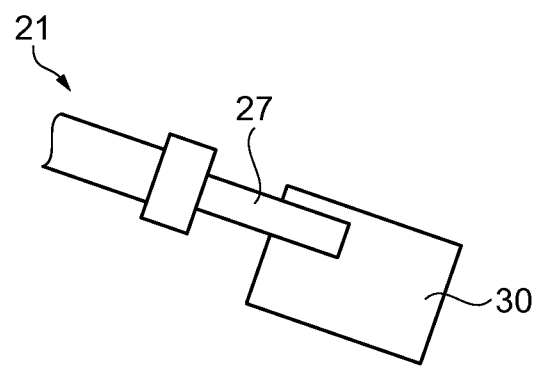

FIGS. 8A and 8B are views illustrating the first hand unit 21 and the work 30 when deliver is performed, that is, when the transfer process is performed. As described above, since only the coarse adjustment is performed on the coordinate system in step S1, the position (place) of the work 30, which is gripped with the first hand unit 21, has dispersion at each time as illustrated in FIGS. 8A and 8B, and the dispersion is not uniform. Further, it is difficult to place the work 30 which is gripped with such a dispersion on the work table 32 such that the Z directions thereof are matched with each other while the work 30 is gripped with the first hand unit 21.

Meanwhile, if the adjustment of the coordinate system of step S1 is performed with high accuracy whenever the work 30 is delivered, there is a problem in that the working efficiency is lowered. In such a robot control method according to the first embodiment, the work 30 is gripped again after the work 30 is dropped to the work table 32, so that the working efficiency is not lowered and, at the same time, the work can be easily aligned with the work table 32. That is, the Z direction of the work table 32 can be matched with the Z direction of the work 30.

As described above, when the robot control method according to the first embodiment is used, the coordinates of the Z direction of the work table 32 can be easily matched with coordinates of the Z direction of the work 30. Further, the imposition operation shown in the above-described FIG. 3 can be easily performed on this work 30. When the operation of imposing the second work 36 (shown with reference to FIG. 3) which is an additional component on the work 30 is performed while the work table 32 is not used, that is, the operation is performed while the work 30 is suspended in the air, it is necessary that the first hand unit 21 should have an amount of grip force to oppose the pressing force, obtained when the second work 36 is imposed, in addition to the weight of the work 30. Further, the increment of this grip force increases the size, weight, and cost of the robot 1.

Meanwhile, when the robot control method according to the first embodiment is used, the base portion of the work 30 can be aligned with the work table 32 without using a complicated control apparatus and an observation apparatus. Further, the work table 32 can receive the above-described pressing force. Therefore, it is sufficient if the grip force of the first hand unit 21 can oppose the force which causes the work 30 to fall in the horizontal direction, in particular, in the X direction. Therefore, the operation of imposing the second work 36, which is an additional component, on the work 30 which has a hardly self-standing shape as shown in FIG. 4A to 4C can be performed using the robot 1 at a low cost, which has a small size and is lightweight.

Meanwhile, as shown in FIG. 7, according to the robot control method according to the first embodiment, the work 30 is placed such that only the coordinates of the Z direction is matched with the coordinates of the work table 32. Therefore, when the second work 36 is imposed, it is necessary to recognize the X coordinates and the Y coordinates of the work 30. The recognition of the coordinates can be easily performed by checking the location of the work 30 by recognizing the location of the work 30 using cameras (not shown) from the three directions which are perpendicular to each other, that is, the X direction, Y direction, and Z direction of the work table 32, as shown in FIG. 7. Thereafter, the above-described imposition operation can be easily performed by driving a fifth hand unit 25 included in the additional robot based on the checked coordinates.

Second Embodiment

Figure 9:
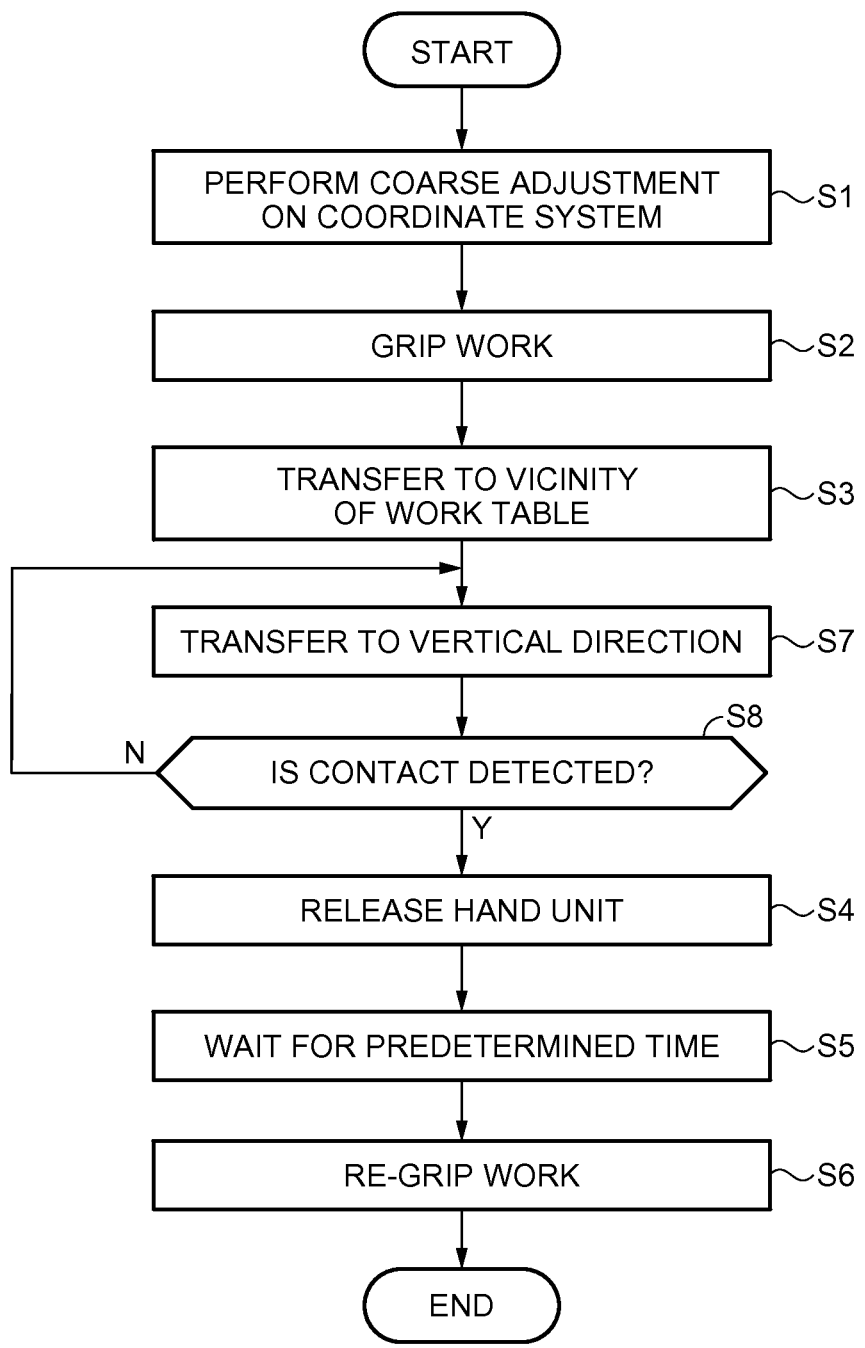
FIG. 9 is a flowchart illustrating a robot control method according to a second embodiment.

Next, a second embodiment of the invention will be described. FIG. 9 is a flowchart illustrating a robot control method according to the second embodiment. Further, FIGS. 10A to 10H are process charts illustrating the robot control method according to the second embodiment. The robot control method according to the second embodiment is similar to the robot control method according to the above-described first embodiment. The configurations of the work 30 which is a target and the robot 1 which is used to deliver the corresponding work are approximately the same. The difference therebetween is a configuration that a contact sensor 31 is added to the first hand unit 21. Here, description is made while drawings corresponding to the above-described FIGS. 1 to 4C, 7, and 8 are omitted and only the flowchart and process charts are used. Like the above-described FIGS. 6A to 6F, FIGS. 10A, 10C, 10E, and 10G are drawings in which the work 30 is viewed from the X direction, and FIGS. 10B, 10D, 10F, and 10H are drawings in which the work 30 is viewed from the Y direction. Further, the finger units 27 are hatched in FIGS. 10B, 10D, 10F, and 10H.

Like the robot control method according to the above-described first embodiment, the robot control method according to the second embodiment includes total four processes, such as a grip process, a transfer process, a release process, and a re-grip process. Hereinafter, description will be made in the order of the processes using the drawings viewed from the both sides.

First, coarse adjustment is performed on coordinate systems in step S1. Thereafter, the work 30 is gripped with the first hand unit 21 in a place which is different from the work table 32 in step S2. These step S1 and step S2 correspond to the grip process.

Figure 10A:
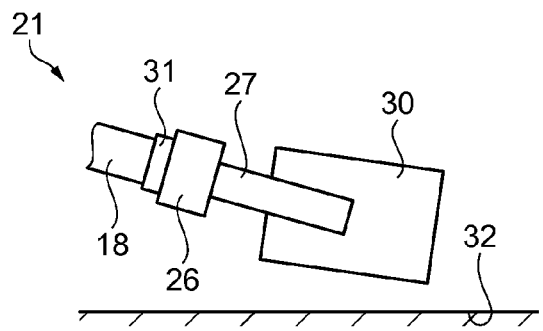
FIGS. 10A to 10H are process charts illustrating the robot control method according to the second embodiment.
Figure 10B:
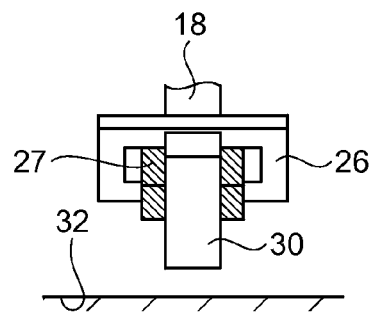
Figure 10C:
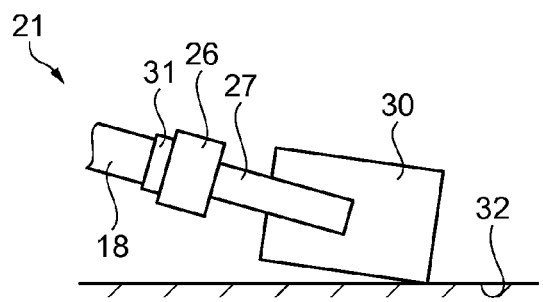
Figure 10D:
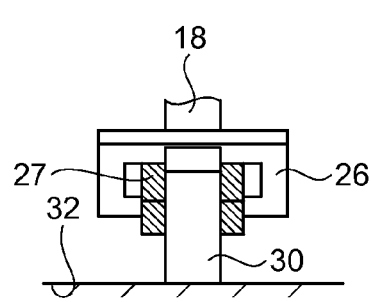

Thereafter, as shown in FIGS. 10A and 10B, the work 30 and the first hand unit 21 which grips the corresponding work are transferred to the vicinity of the work table 32 by controlling the above-described 6 axes of the robot 1 in next step S3. Thereafter, the first hand unit 21 is approximated to the work table 32 in next step S7. This approximation is performed while detecting whether the work 30 comes into contact with the work table 32 using the contact sensor 31. This operation of detecting the contact corresponds to step S8. Further, as shown in FIGS. 10C and 10D, a part of the work 30 comes into contact with work table 32 by performing steps S7 and S8.

In the robot control method according to the second embodiment, the steps S3, S7, and S8 correspond to the transfer process. That is, unlike the transfer process according to the first embodiment, the transfer process according to the second embodiment is a process of driving the first hand unit 21 until a part of the work 30 comes into contact with the work table 32.

Figure 10E:
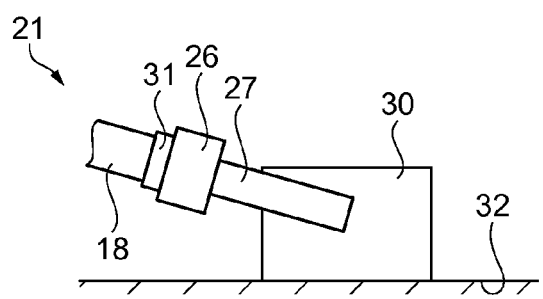
Figure 10F:
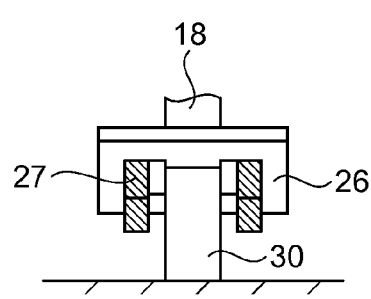
Figure 10G:
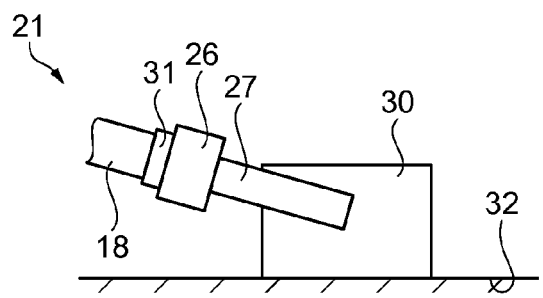
Figure 10H:
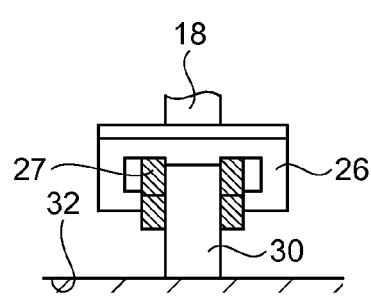

Further, as shown in FIGS. 10E and 10F, the finger units 27 are released and the work 30 is dropped (freely falls) to the work table 32 in next step S4. Thereafter, a predetermined time is waited while the finger units 27 are released in next step S5. Thereafter, (the base portion) of the work 30 can be aligned with the work table 32. That is, the work 30 becomes a state in which the base portion of the corresponding work is stable with respect to the work table 32. These steps S4 and S5 correspond to the release process. Meanwhile, the fact that it is preferable that the finger units 27 be released until the finger units are completely separated from the work 30 but not be excessively largely opened in step S4 is the same as the robot control method according to the above-described first embodiment.

Next, as shown in FIGS. 10E and 10F, the finger units 27 are closed and the work 30 which is aligned with the work table 32 is gripped again in step S6. This step S6 corresponds to the re-grip process.

In the above-described processes, the work 30, which is placed in a state in which the coordinates thereof are indefinite, can be delivered to the work table 32 and, at the same time, can be fixed by the first hand unit 21 in the state in which the base portion thereof is aligned with the work table 32. That is, the side surfaces of the work 30 which is placed on the work table 32 can be fixed and supported by the first hand unit 21.

As described above, in the robot control method according to the second embodiment, the base portion of the work 30 can be aligned with the work table 32 without using a complicated control apparatus and an observation apparatus like the robot control method according to the above-described first embodiment. Further, in the robot control method according to the second embodiment, the finger units 27 are released after bringing apart of the work 30 into contact with the work table 32, so that the drop distance of the work 30 can be reduced when the base portion of the work 30 is aligned with the work table 32. Therefore, shock occurred due to the drop can be reduced, and the work can be easily aligned with the work table 32 even when the work 30 is weak to vibration or the work 30 is formed of a material which is easily damaged.

Further, since the vibration caused by the drop can be reduced, time that is necessary until the re-grip process starts after the release process is performed can be reduced, so that operation efficiency can be improved.

Third Embodiment

Figure 11:
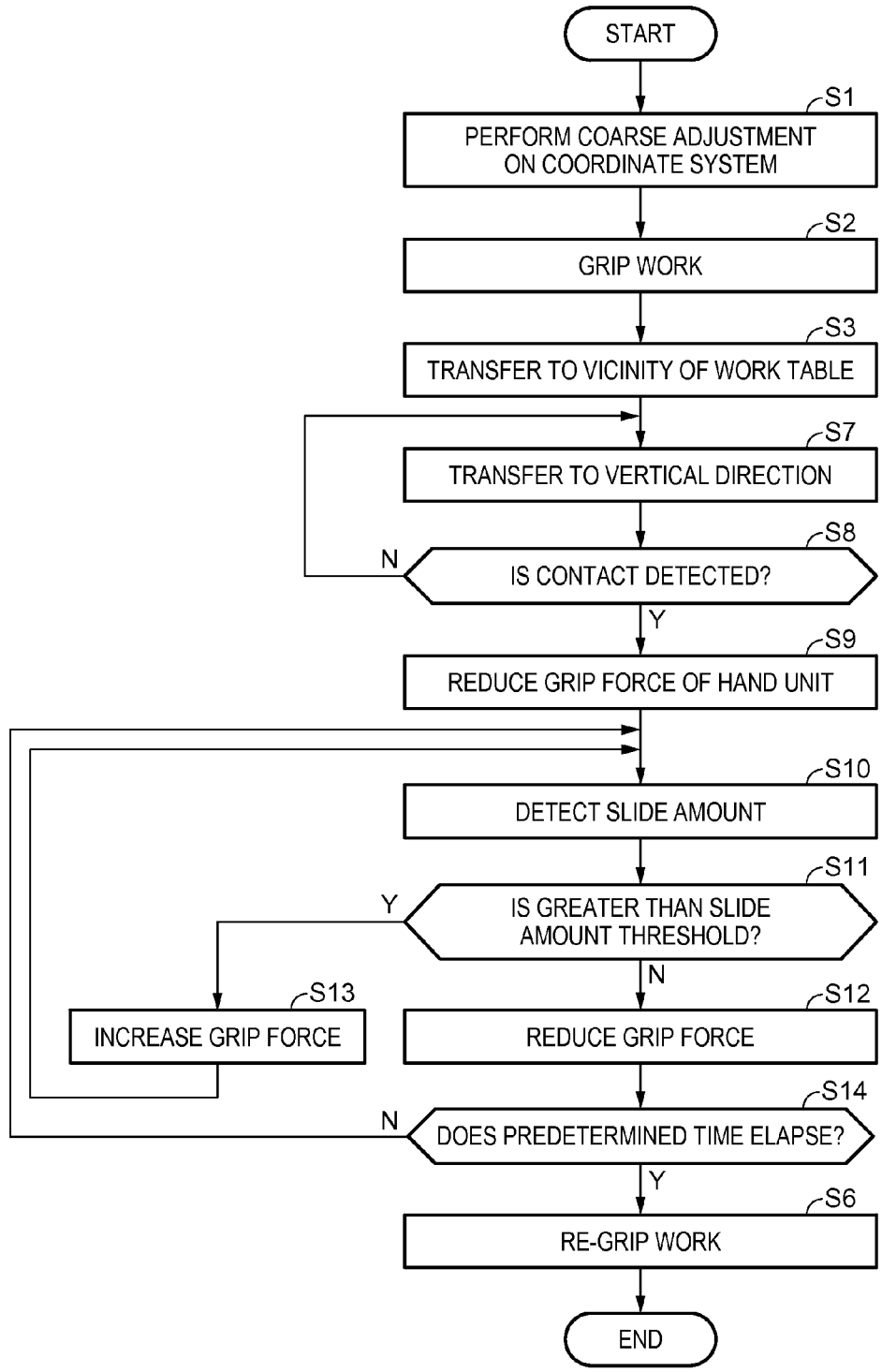
FIG. 11 is a flowchart illustrating a robot control method according to a third embodiment.

Next, a third embodiment of the invention is described. FIG. 11 is a flowchart illustrating a robot control method according to the third embodiment. Further, FIGS. 12A to 12F are process charts illustrating the robot control method according to the third embodiment. The robot control method according to the third embodiment is similar to the robot control method according to the above-described first embodiment. The configurations of the work 30 which becomes a target and the robot 1 which is used to deliver the corresponding work are approximately the same. Here, like the second embodiment, description will be made using only a flowchart and process charts.

Figure 12A:
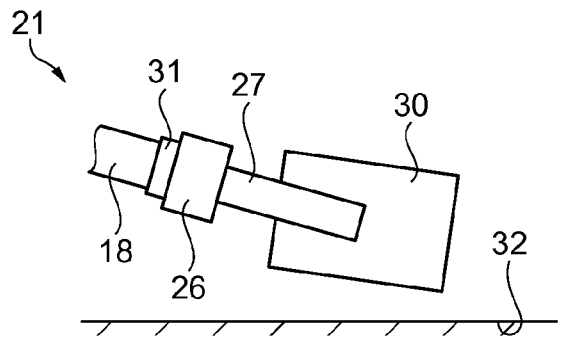
FIGS. 12A to 12F are process charts illustrating the robot control method according to the third embodiment.
Figure 12B:
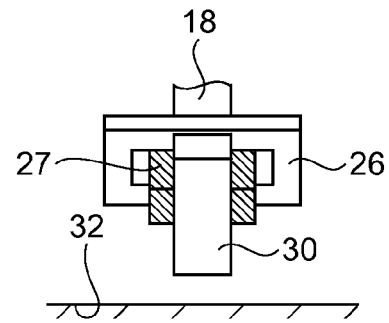
Figure 12C:
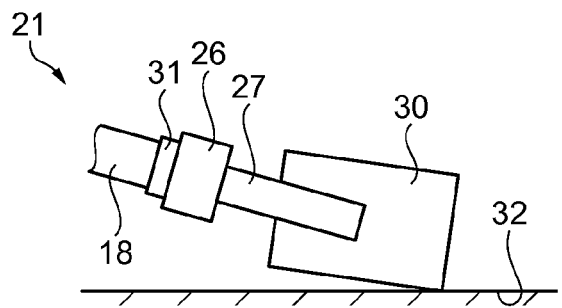
Figure 12D:
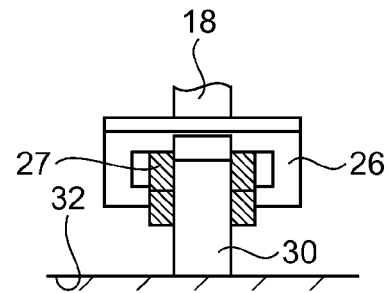
Figure 12E:
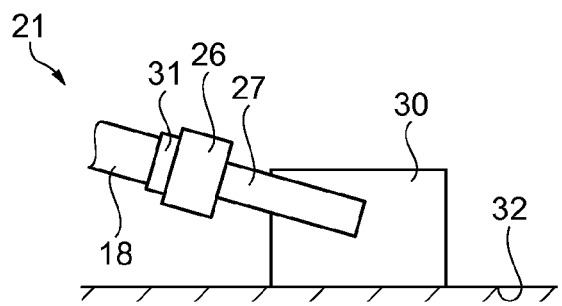
Figure 12F:
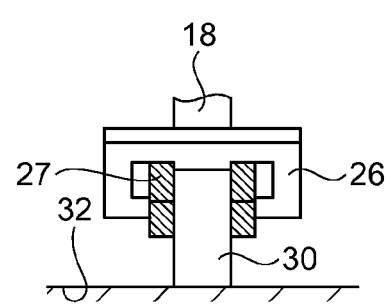

Like the above-described FIGS. 6A to 6F and FIGS. 10A to 10G, FIGS. 12A, 12C, and 12E are drawings in which the work 30 is viewed from the X direction and FIGS. 12B, 12D, and 12F are drawings in which the work 30 is viewed from the Y direction. Further, the finger units 27 are hatched in FIGS. 12B, 12D, and 12F. Further, according to the third embodiment, the first hand unit 21 which grips the work 30 includes the slide sensors 33 (refer to FIG. 2) in addition to the contact sensor 31. However, since the slide sensors 33 are arranged on the inner sides of the finger units 27, the slide sensors 33 are not shown in FIGS. 12A to 12F.

Like the robot control method according to the above-described first and second embodiments, the robot control method according to the third embodiment includes a total of four processes, that is, a grip process, a transfer process, a release process, and a re-grip process. Further, the grip process and the transfer process of the four processes are approximately the same as the corresponding processes according to the above-described second embodiment. Therefore, hereinafter, the robot control method according to the third embodiment will be described in the order of processes centering on the points which are different from that of the robot control method according to the second embodiment using the drawings viewed from both sides.

First, like in the second embodiment, a grip process which includes steps S1 and S2 is performed. Thereafter, next, step S3 is performed such that the work 30 and the first hand unit 21 which grips the corresponding work are delivered to the vicinity of the work table 32 as shown in FIGS. 12A and 12B. Thereafter, next, step S7 and step S8 are performed such that a part of the work 30 comes into contact with the work table 32 using the contact sensor 31, as shown in FIGS. 12C and 12D. As described above, the transfer process includes step S3, step S7, and step S8.

Next, a release process which includes steps S9 to S14 is performed. First, in step S9, the finger units 27 are released slightly and the grip force is reduced until the work 30 starts to slide toward the work table 32. Thereafter, the work 30 gradually slides from the inner sides of the finger units 27 and is dropped on the work table 32 as shown in FIGS. 12E and 12F. Here, while step S9 is performed, the slide amount of the work 30 is detected using the slide sensor 33 (refer to FIG. 2) in step S10. Thereafter, this slide amount is compared with a predetermined threshold value and it is determined whether the slide amount is greater than the predetermined threshold in step S11. When it is determined that the slide amount is greater than the threshold value, the grip force is increased by slightly closing the finger units 27 in step S13. Further, the slide amount of the work 30 is detected again in step S10 in this mode.

When it is determined that the slide amount is less than the threshold value, the finger units 27 are slightly released and the grip force is lowered in step S12. Further, step S10 to step S13 are repeated, and time obtained after step S9 starts is measured in step S14. When it is determined that a predetermined time elapses, the re-grip of the work in step S6 is performed. This step S6 corresponds to the re-grip process. Further, since the finger units 27 are not completely released in the release process according to the third embodiment, there is little difference in the mode of the finger units 27 and the mode of the work 30 between the release process and the re-grip process. Therefore, a drawing illustrating the re-grip process is not shown.

In the above-described processes, the work 30, which is placed with indefinite coordinates, can be delivered to the work table 32 and can be fixed using the first hand unit 21 while the base portion thereof is aligned with the work table 32. That is, the side surface of the work 30 which is placed on the work table 32 can be supported and fixed by the first hand unit 21. Meanwhile, before the work is gripped again in step S6, the process of completely releasing the finger units 27 may be performed.

As described above, according to the robot control method according to the third embodiment, the base portion of the work 30 can be aligned with the work table 32 without using a complicated control apparatus and an observation apparatus like the robot control method according to the above-described first and second embodiments. Further, the robot control method according to the third embodiment has the characteristics in that the work 30 is gradually dropped using the slide sensor 33 after a part of the work 30 comes into contact with the work table 32 using the contact sensor 31. As a result, the shock of the drop can be further reduced. Therefore, even when the work 30 is highly weak to vibration or even when the work 30 is formed of a material which is very easily damaged, the work 30 can be easily aligned with the work table 32.

Fourth Embodiment

Next, a robot control method according to a fourth embodiment of the invention and a robot which is used in the fourth embodiment will be described. Unlike the above-described first to third embodiments, the robot control method according to the fourth embodiment has the characteristics of adjusting the coordinate system of the work 30 without using the work table 32. In particular, the coordinate system of the work 30 is adjusted to a hand unit (a second hand unit 22 which will be described later). The main body of the robot which includes the second hand unit 22 is approximately the same as that of the robot 1 shown in FIG. 1. Further, the robot control method according to the fourth embodiment can use various shapes of works 30, which include the work 30 shown in FIG. 4A to 4C as a target. Here, the robot control method according to the fourth embodiment will be described with reference to FIG. 13 which illustrates the second hand unit 22 and the process charts of FIGS. 14A to 14F while the descriptions of the main body of the robot 1 and the shape of the work 30 are omitted.

Figure 13:
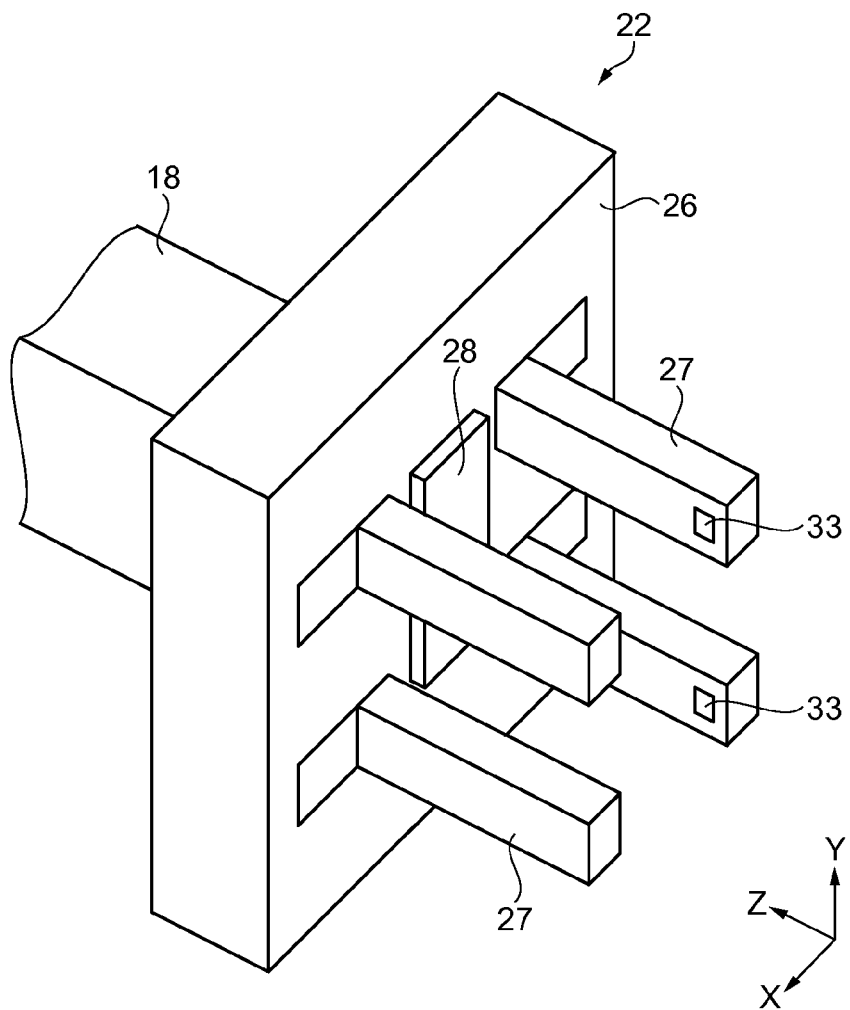
FIG. 13 is a perspective view illustrating the outline of a second hand unit used according to a fourth embodiment.

FIG. 13 is a perspective view illustrating the outline of the second hand unit 22 of the robot used in the robot control method according to the fourth embodiment. The second hand unit 22 includes a base portion 26 which continues to a wrist section 18, finger units 27, and a planar portion 28. The finger units 27 move in the X direction and grip the work 30. Further, the slide sensors 33 are provided on the inner sides of the finger units 27, that is, the surfaces which face other finger units 27 in the X direction.

Figure 14A:
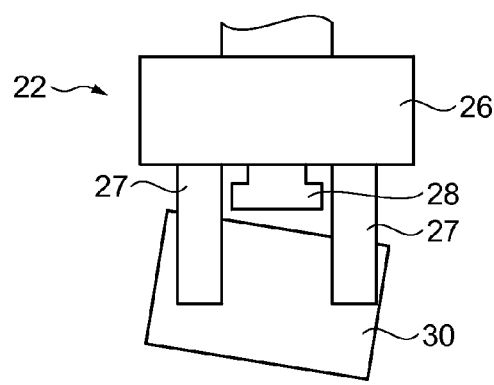
FIGS. 14A to 14F are process charts illustrating the robot control method according to the fourth embodiment.
Figure 14B:
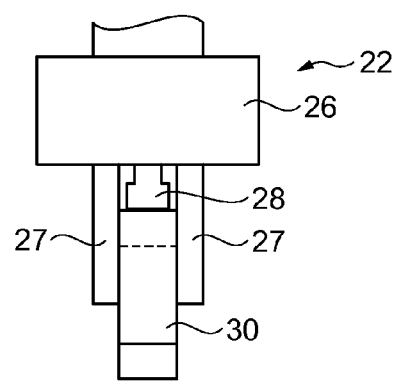
Figure 14C:
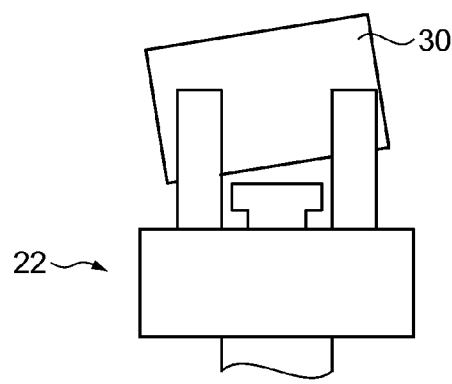
Figure 14D:
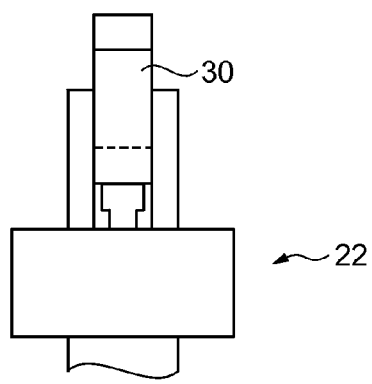
Figure 14E:
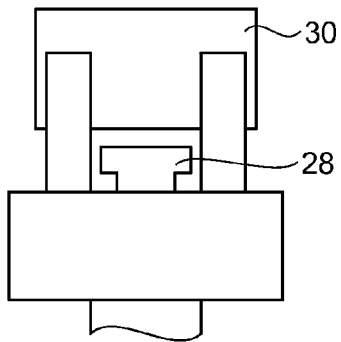
Figure 14F:
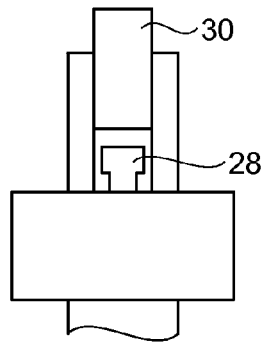

FIGS. 14A to 14F are process charts illustrating the robot control method according to the fourth embodiment, that is, a process of adjusting the coordinates of the work 30. In the drawings, FIGS. 14A, 14C, and 14E are views in which the work 30 is viewed from the X direction, and FIGS. 14B, 14D, and 14F are views in which the work 30 is viewed from the Y direction. Meanwhile, since the coordinate system of the work 30, that is, the X direction, the Y direction, and the Z direction, are the same as in FIG. 3, the coordinate system is not shown in FIGS. 14A to 14F, FIGS. 15A to 15D, and FIGS. 17A to 17D which will be described later. Hereinafter, description will be made in the order of processes.

First, like the robot control method according to the above-described first embodiment, the coarse adjustment is performed on the coordinate system. Thereafter, the finger units 27 are moved in the X direction and grip the work 30, as shown in FIGS. 14A and 14B. This process corresponds to a work grip process. When the work 30 is gripped by the robot 1, the work 30 is generally gripped in such a way that the second hand unit 22 is approximated to the work 30 from the upper portion of the work 30 which is placed in the part box. Therefore, the planar portion 28 is located on the upper side of the work 30.

Here, since this process only aims at gripping the work 30, the accuracy of the coordinate system is coarse. Therefore, the degree of parallelization of the base surface of the work 30 is not secured with respect to the planar portion 28. Further, the surface is near to a line in the case of the work 30 shown in FIG. 4B. Further, in the case of the work 30 shown in FIG. 4C, the surface corresponds to two points. That is, the work 30 is gripped in the state in which an assumed line drawn between the two points is not parallel to the planar portion 28.

Next, as an inversion process, the robot 1 is driven such that the planar portion 28 faces upwards, that is, the direction which is opposite to the gravity direction, as shown in FIGS. 14C and 14D. That is, the directions of the work 30 and the base portion 26 are inverted such that the base portion 26 and the planar portion 28 are positioned below the work 30. This process corresponds to the inversion process. Meanwhile, in some way, if the work 30 can be gripped such that the planar portion 28 is positioned below the work 30 as shown in FIGS. 14C and 14D from the beginning, this process can be omitted.

Next, the work 30 is dropped to the planar portion 28 by reducing the grip force of the second hand unit 22, accurately, the grip force of the finger units 27, as shown in FIGS. 14E and 14F. The process corresponds to the release process. Here, this drop is performed such that the drop velocity of the work 30 which is detected by the slide sensor 33, that is, slide velocity, falls within a predetermined range. Therefore, the finger units 27 are not completely released. Therefore, the work 30 gradually slides to the planar portion 28. Further, the work 30 stops in the state in which the base surface is aligned with the planar portion 28. This mode always stays constant if the shape of the work 30 is the same. Therefore, the coordinate system of the second hand unit 22 can be matched with the coordinate system of the work 30.

Thereafter, a re-grip process of raising the grip force of the second hand unit 22 again can be performed. It is preferable that this process be performed after the work 30 stops and a predetermined time has elapsed. It is preferable to determine whether the work 30 stops using the slide sensor 33.

Meanwhile, the robot control method according to the fourth embodiment can be performed without using the slide sensor 33. That is, in the release process, the finger units 27 can be completely released, and the work 30 can freely drop to the planar portion 28.

The robot control method according to the fourth embodiment has the characteristics of matching the coordinate system of the work 30 with the coordinate system of the second hand unit 22 without using a plane surface, such as the work table 32, which is separately provided from the robot 1. In this robot control method, the process of delivering the work 30 to the work table 32 can be omitted, so that the coordinate systems can be more effectively matched.

Fifth Embodiment

Next, a robot control method according to a fifth embodiment of the invention will be described. The robot control method according to the fifth embodiment is similar to the robot control method according to the above-described fourth embodiment. That is, this is a control method of enabling the coordinate system of the work 30 to be matched using the second hand unit 22 which includes the planar portion 28 while the work table 32 is not used. Therefore, the second hand unit 22 used in the robot control method according to the fifth embodiment is approximately the same as the second hand unit 22 used in the robot control method according to the fourth embodiment. However, the fact that the planar portion 28 is a moving member is different from the fourth embodiment. Here, description will be made using process charts.

FIGS. 15A to 15D are process charts illustrating the robot control method according to the fifth embodiment, that is, the process of matching the coordinates of the work 30. Hereinafter, each process will be described. First, like the robot control method according to the above-described fourth embodiment, the coarse adjustment is performed on the coordinate system. Thereafter, as a work grip process, the finger units 27 are moved in the X direction and the work 30 is griped as shown in FIGS. 15A and 15B. Like the work grip process according to the fourth embodiment, the work 30 is gripped such that an interval between the work 30 and the planar portion 28 is generated, that is, the planar portion 28 is positioned below the work 30.

Thereafter, as a coordinate matching process, the planar portion 28 is driven to the direction which is opposite to the side of the base portion 26 such that the planar portion 28 is pressed against the work 30 as shown in FIGS. 15C and 15D. Thereafter, the surface of the planar portion 28 completely faces the surface of the work 30. That is, the base surface of the work 30 is aligned with the planar portion 28 thereafter such that the coordinate system of the second hand unit 22 is matched with the coordinate system of the work 30. Like the above-described re-grip process, this process is performed using the slide sensor 33 such that the velocity of the work 30, which is moved by being pressed against the planar portion 28, falls within a predetermined range. Further, this process is performed while lowering the grip force such that damage does not occur on the surface of the work 30 due to the slide with finger units 27. Meanwhile, after the base surface of the work 30 is aligned with the planar portion 28, a re-grip process of raising the grip force of the second hand unit 22 again may be performed.

In the robot control method according to the fifth embodiment, the coordinate system of the second hand unit 22 can be matched with the coordinate system of the work 30 like the robot control method according to the above-described fourth embodiment. Further, the robot control method according to the fifth embodiment has the characteristics in that the coordinate systems are matched by moving the planar portion 28 while the work 30 is fixed. Therefore, it is not necessary to drop the work 30 using gravity, and the above-described coordinate systems can be matched without performing the inversion process of turning the work 30 to the upwards. Therefore, in the robot control method according to the fifth embodiment, both the process of delivering the work 30 on the work table 32 and the inversion process can be omitted, and the above-described coordinate systems can be more effectively matched.

Sixth Embodiment

Next, a robot control method according to a sixth embodiment of the invention and a robot which is used in the sixth embodiment will be described. The robot control method according to the sixth embodiment is similar to the robot control methods according to the above-described fourth and fifth embodiments. That is, this method is a control method of enabling the coordinate system of work 30 to be matched without using the work table 32. However, the robot control method according to the sixth embodiment is different from the robot control methods according to the above-described fourth and fifth embodiments in the fact that the above-described coordinates are matched using a third hand unit 23 capable of gripping the work 30 such that the work 30 can be rotated. Here, the sixth embodiment will be described using a drawing which shows the third hand unit 23 and process charts.

Figure 16:
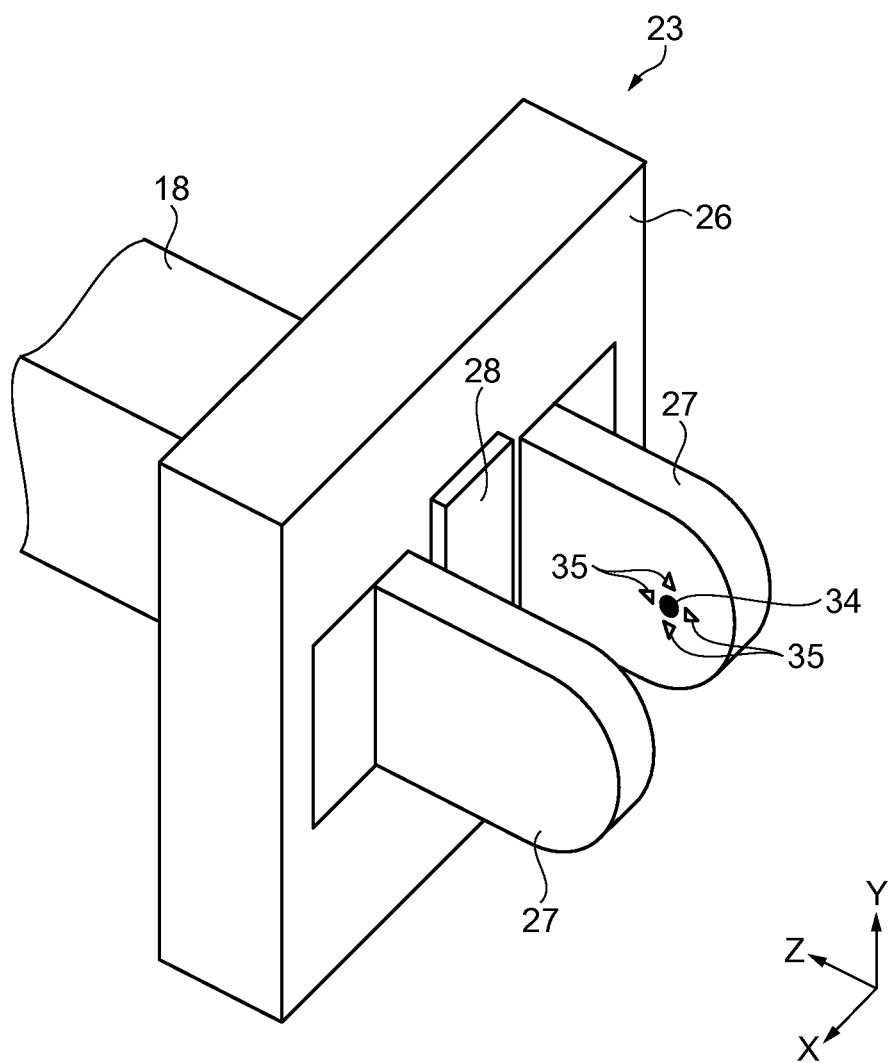
FIG. 16 is a perspective view illustrating the outline of a third hand unit which is used according to a sixth embodiment.

FIG. 16 is a perspective view illustrating the outline of the third hand unit 23 included in the robot which is used in the robot control method according to the sixth embodiment. The third hand unit 23 includes a base portion 26 which is continued to the wrist section 18, finger units 27, and a planar portion 28. The planar portion 28 is a moving member like the corresponding planar portion of the second hand unit 22. The finger units 27 are movable in the X direction, and can grip the work 30 which is positioned in the Y direction like the finger units 27 of the above-described second hand unit 22. However, more specifically, only two finger units 27 are included in the third hand unit 23. Further, the widths (the size in the Y direction) thereof are slightly larger, compared to the finger units 27 included in the second hand unit 22. Further, a bearing unit 34 and rotation sensors 35 are provided on the inside of the finger unit 27, that is, the surface of a side which faces another finger unit 27 in the X direction. As shown in the drawing, a plurality of rotation sensors 35 is provided to surround the bearing unit 34.

Figure 17A:
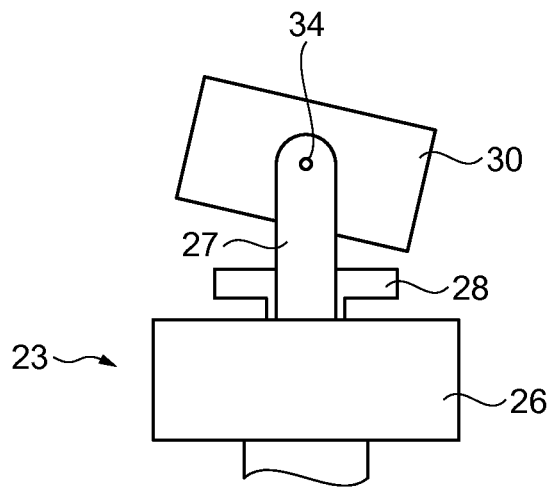
FIGS. 17A to 17D are process charts illustrating a robot control method according to the sixth embodiment.
Figure 17B:
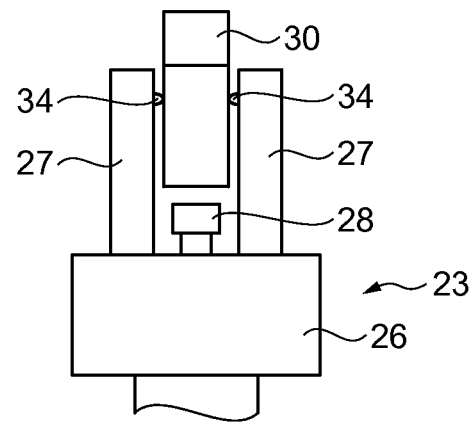

FIGS. 17A to 17D are process charts illustrating the robot control method according to the sixth embodiment, that is, the process charts illustrating a method of matching the coordinates of the work 30, which is performed using the third hand unit 23. Hereinafter, each process will be described. First, the coarse adjustment of the coordinate system is performed like the robot control method according to the above-described fourth and fifth embodiments. Thereafter, as a work grip process, the finger units 27 are moved in the X direction to grip the work 30 as shown in FIGS. 17A and 17B.

As described above, since the bearing units 34 are provided in the finger units 27, the work 30 is gripped with the corresponding bearing units. Therefore, when grip force is not sufficient, there is a possibility that the work 30 is rotated centering on the bearing units 34. Here, in this process, the movement of the work is measured using the rotation sensors 35, and the grip force is adjusted such that the rotation does not occur.

Figure 17C:
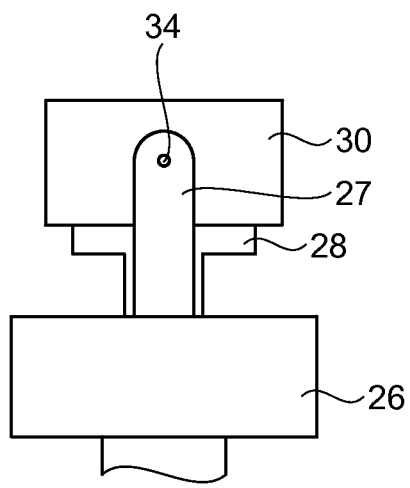
Figure 17D:
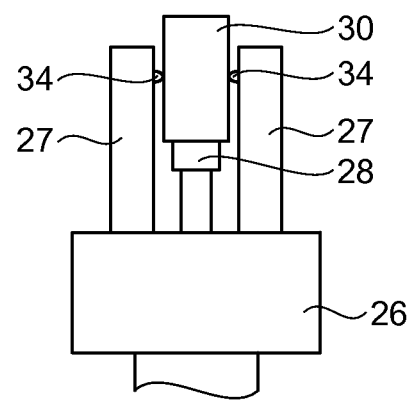

Next, as a coordinate adjustment process, the planar portion 28 is driven upwards, that is, the direction which is opposite to the side of the base portion 26 as shown in FIGS. 17C and 17D. Thereafter, the work 30 is rotated centering on the bearing units 34. This process is performed while the state of the rotation of the work 30 is measured using the rotation sensors 35. That is, the driving speed of the planar portion 28 is adjusted such that the work 30 is rotated at a uniform velocity. Further, the grip force is adjusted such that the work 30 is smoothly rotated. Further, when the stop of the rotation of the work 30 is recognized by the rotation sensors 35, the driving of the planar portion 28 stops. In the above-described processes, the coordinate system of the third hand unit 23 can be matched with the coordinate system of the work 30 by aligning the base surface of the work 30 with the planar portion 28.

In the robot control method according to the sixth embodiment, the coordinate system of the third hand unit 23 can be matched with the coordinate system of the work 30 without using the inversion process like the robot control method according to the above-described fifth embodiment. Further, since the above-described coordinate systems are matched by only rotating the work 30 without sliding the work 30 gripped with the finger units 27, the entire length of the finger units 27 (size in the Z direction) can be reduced. Therefore, the robot control method according to the sixth embodiment has the characteristics in that the coordinate system can be matched by gripping the work 30 which is relatively large compared to the shape of the third hand unit 23.

Various types of modification can be considered as the embodiments of the invention in addition to each of the above-described embodiments. Hereinafter, modifications will be described.

First Modification

In the release process according to the above-described fourth embodiment, the work 30 is dropped for the purpose of removal while the finger units 27 are not completely released. However, in the above-described process, the work 30 can be freely dropped by completely releasing the finger units 27. In this method, the configuration of the second hand unit 22 can be simplified without the need for disposing the slide sensor 33.

Further, instead of the slide sensors 33, bearings held by springs may be disposed. In this configuration, the work 30 can be gradually dropped without using the slide sensors 33. Therefore, the same effect can be obtained by simplifying the configuration of the second hand unit 22 and the control apparatus (not shown) of the robot 1.

Second Modification

In the above-described fifth and sixth embodiments, the planar portion 28 is perpendicular to the direction in which the corresponding planar portion is driven, that is, the Z direction. However, setting may be made such that the planar portion 28 is inclined to the Z direction. In this robot control method, the coordinate systems can be adjusted such that the work 30 has a predetermined angle to the Z direction. Therefore, the operation of imposing the second work 36 on the work 30 from an oblique direction can be effectively performed.

Third Modification

In the above-described first to third embodiments, the work 30 is dropped to the plane (the work table 32 in the form of the plane). However, when the base portion of the work 30 which is a target is a plane having a sufficient area, for example, when the work 30 shown in FIG. 4A is the work 30 which has a shape which is enlarged in the X direction, it is not necessary that (the upper surface of) the work table 32 be limited to a plane. (The upper surface) of the work table 32 may be a surface which has a regular unevenness. Meanwhile, this "surface which has a regular unevenness" means a surface which is included in a plane in which (the top of) the convex portion is the same. The plane is determined when three points come into contact therewith. Therefore, when the above-described work 30 is a target, the coordinate system of the work 30 can be adjusted even if the work table 32 which has this upper surface is used.

Further, in a similar manner, in the above-described fourth to sixth embodiments, (a surface which is opposite to the work 30 of) the planar portion 28 included in the second hand unit 22 can be configured with a surface having regular unevenness. When the base portion of the work 30 is a plane having a sufficient area, the coordinate system of the work 30 can be adjusted even when the second hand unit 22, which has the planar portion 28 in this mode, is used.

The entire disclosure of Japanese Patent Application No. 2011-073562, filed Mar. 29, 2011 is expressly incorporated by reference herein.

What is claimed is:

1. A robot control method, comprising:
   gripping a work with a hand unit by operating a motor;
   transferring the work to a vicinity of a plane by operating the motor;
   releasing the work to the plane by reducing a grip force of the hand unit by operating the motor so as to align the work with the plane; and
   re-gripping the work again with the hand unit by operating the motor, wherein
   the robot includes a slide sensor, which measures a slide amount of the work with respect to the hand unit, in a portion of the hand unit which comes into contact with the work, and
   the releasing is performed while grip force of the hand unit is adjusted such that the slide amount per unit time is less than a threshold.

2. The robot control method according to claim 1,
   wherein the hand unit includes a sensor which is capable of detecting contact of the work and the plane, and
   wherein the transferring includes approximating the hand unit to the plane until the sensor detects contact of a part of the work and the plane.

3. The robot control method according to claim 2,
   wherein the sensor is any one of three types of sensors which include a pressure sensor which measures pressure applied to the work, a force sensing sensor which measures force applied to the hand unit, and an image sensor which images an interval between the work and the plane.

4. The robot control method according to claim 1, wherein the plane is approximately horizontal, and
wherein the re-gripping is performed after a predetermined time elapsed after the dropping the work starts.

5. The robot control method according to claim 1, wherein the re-gripping is performed after a predetermined time elapsed after the dropping the work starts.

* * * * *